(12) United States Patent
Nakai

(10) Patent No.: US 9,676,350 B2
(45) Date of Patent: Jun. 13, 2017

(54) SHIELDED PIPE HAVING FIXED AND BENDABLE PORTIONS

(71) Applicant: SUMITOMO WIRING SYSTEMS, LTD., Yokkaichi, Mie (JP)

(72) Inventor: Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/023,338

(22) PCT Filed: Sep. 16, 2014

(86) PCT No.: PCT/JP2014/074421
§ 371 (c)(1),
(2) Date: Mar. 18, 2016

(87) PCT Pub. No.: WO2015/049979
PCT Pub. Date: Apr. 9, 2015

(65) Prior Publication Data
US 2016/0229359 A1    Aug. 11, 2016

(30) Foreign Application Priority Data

Oct. 4, 2013 (JP) .................................. 2013-209605

(51) Int. Cl.
*B60R 16/02* (2006.01)
*H02G 3/04* (2006.01)

(52) U.S. Cl.
CPC ....... *B60R 16/0215* (2013.01); *H02G 3/0481* (2013.01)

(58) Field of Classification Search
CPC ............. H01B 7/17; H01B 7/22; H01B 7/282

USPC ................ 174/113 C, 72 A, 102 R; 439/582
See application file for complete search history.

(56) References Cited

U.S. PATENT DOCUMENTS

| 6,558,172 | B2 * | 5/2003 | Kanagawa | ........... H01R 9/0524 439/582 |
| 6,967,288 | B2 * | 11/2005 | Ohsawa | ............... B60Q 1/0088 174/102 R |
| 2013/0032393 | A1 * | 2/2013 | Toyama | .............. B60R 16/0215 174/72 A |

FOREIGN PATENT DOCUMENTS

| JP | S62-54521 U | 4/1987 |
| JP | 2007-081158 A | 3/2007 |
| JP | 2008-034196 A | 2/2008 |
| JP | 2012-186978 A | 9/2012 |

OTHER PUBLICATIONS

Nov. 25, 2014 Search Report issued in International Patent Application No. PCT/JP2014/074421.

* cited by examiner

*Primary Examiner* — Michael F McAllister
(74) *Attorney, Agent, or Firm* — Oliff PLC

(57) ABSTRACT

A shielded pipe includes a pipe body that is made of a synthetic resin material and is formed into a predetermined shape, and a shielding portion that is constituted by a braided wire made of a plurality of metal wires formed into a tubular shape. The shielding portion sheathes an outer circumferential surface of the pipe body, covering the pipe body over substantially its entire length. The braided wire may be formed to be longer than the pipe body, and may protrude beyond the two ends of the pipe body. Furthermore, a heat-shrinkable tube may sheathe the braided wire and serve as a protective portion for protecting the braided wire.

5 Claims, 3 Drawing Sheets

SHIELDED PIPE HAVING FIXED AND BENDABLE PORTIONS

This application is a national stage application of PCT/JP2014/074421, international filing date Sep. 16, 2014, and claims priority to JP2013-209605, filed in Japan on Oct. 4, 2013, the entire disclosures of which are hereby incorporated by reference.

BACKGROUND

The present invention relates to a shielded pipe.

In hybrid vehicles, for example, a battery that is mounted in a rear portion of the vehicle and an inverter that is mounted in an engine compartment are connected to each other using a plurality of electric wires. These electric wires are inserted into a shielded pipe to prevent noises superposed on the electric wires from adversely affecting the outside.

As disclosed in JP 2007-81158A, such a shielded pipe is generally made of metal (made of an aluminum alloy, for example). The shielded pipe is disposed along the lower surface of the vehicle and bent into a predetermined shape. Because regions of the electric wires that protrude to the outside from the shielded pipe need to be capable of being freely bent, braided wires that have superior bendability are connected to the two end portions of the shielded pipe. The electric wires inside the shielded pipe are connected to the battery and the inverter through the braided wires.

SUMMARY

However, since a conventional shielded pipe is made of metal as mentioned above, an increase in weight cannot be avoided. Moreover, the bending processing is not always easily performed. One might think that as a measure taken against these problems, it is sufficient to merely reduce the thickness of the shielded pipe. However, since the bent portion is flattened (crushed) and it becomes difficult to ensure the space for accommodating the electric wires, such a measure is not practical.

The present invention was made based on the foregoing circumstances, and it is an object thereof to provide a shielded pipe that is light in weight and is easily bent into a desired bent shape.

A shielded pipe according to an aspect of the present invention is a shielded pipe into which an electric wire is insertable, and the shielded pipe includes a pipe body that is made of a synthetic resin material and is formed into a predetermined shape, and a shielding portion that is constituted by a braided wire made of a plurality of metal wires formed into a tubular shape and sheathes an outer circumferential surface of the pipe body, covering the pipe body over substantially its entire length, wherein the braided wire has flexibility and protrudes beyond at least one side of the pipe body to form a movable arrangement portion having bendability in a length region in which the braided wire protrudes from the pipe body and a fixed arrangement portion in a length region in which the pipe body is provided.

With the shielded pipe of the present invention, the weight can be reduced compared with a conventional metal pipe, and since the pipe body is made of a synthetic resin, the bent shape required for the pipe body can be easily formed. Moreover, the effect that a shielding function can be secured by merely inserting the pipe body into a braided wire formed into a tubular shape can be also provided. Furthermore, it is possible to extend the shielding portion by merely causing a portion of the braided wire to protrude from the end portion of the pipe body, and the movable arrangement portion can follow a sharply curved layout due to its flexibility.

DETAILED DESCRIPTION OF EMBODIMENTS

A preferred embodiment of the present invention will be described below.

(1) It is preferable that the outer circumferential surface of the shielding portion is configured to be covered with a protective portion.

With this configuration, the shielding portion is covered with the protective portion, thus making it possible to prevent the shielding portion from rusting and to protect the pipe body against damage due to the application of an external force.

(2) Furthermore, it is preferable that the protective portion is constituted by a heat-shrinkable tube.

With this configuration, the protective portion can be formed so as to be in intimate contact with the outer circumference of the shielding portion, by heating the heat-shrinkable tube after the heat-shrinkable tube sheathes the shielding portion. The heat-shrinkable tube has a large diameter before being heated, and thus can easily sheathe the shielding portion.

Embodiment

Next, an embodiment in which a shielded pipe of the present invention is embodied will be described with reference to the drawings. A shielded pipe 1 of this embodiment is applied, in a hybrid car, to a wire harness WH for connecting a battery 2 that is mounted in a compartment on the rear side and an inverter 3 that is mounted in an engine compartment.

Figure 1:
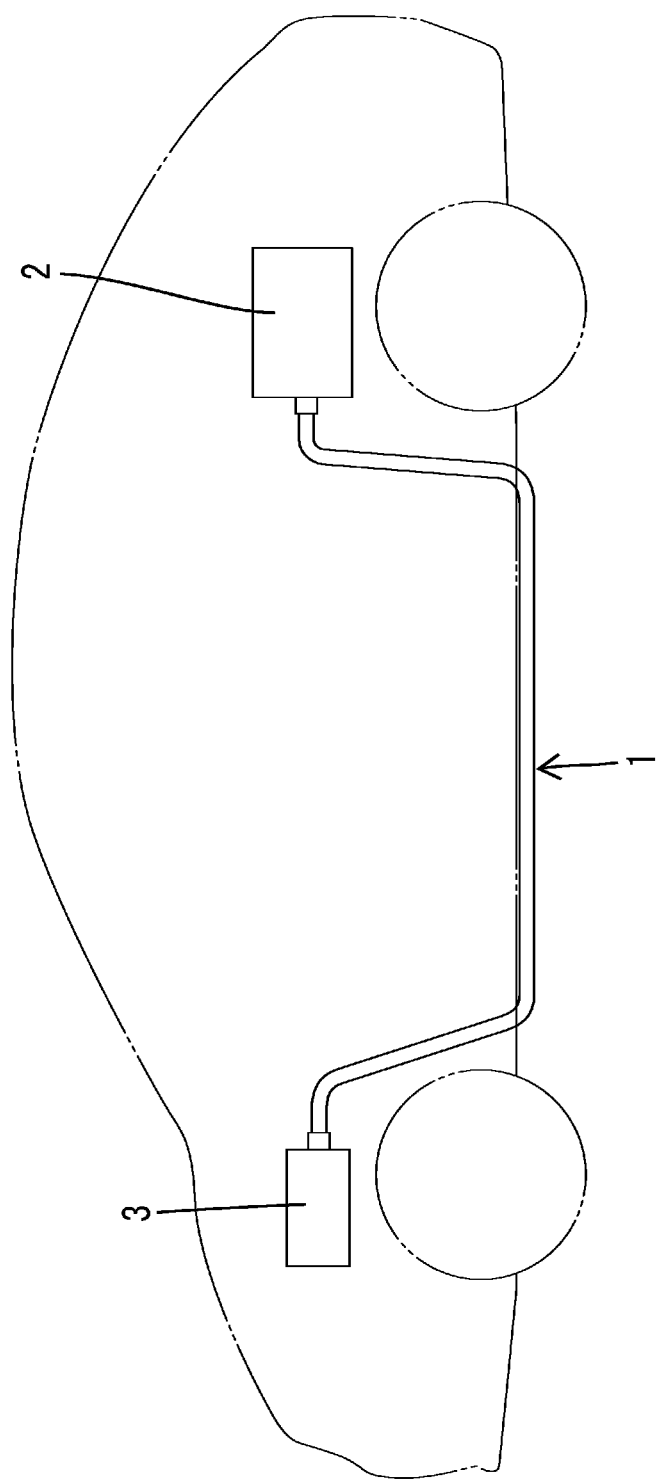
FIG. 1 is a diagram showing a state in which a shielded pipe is arranged.
Figure 2:
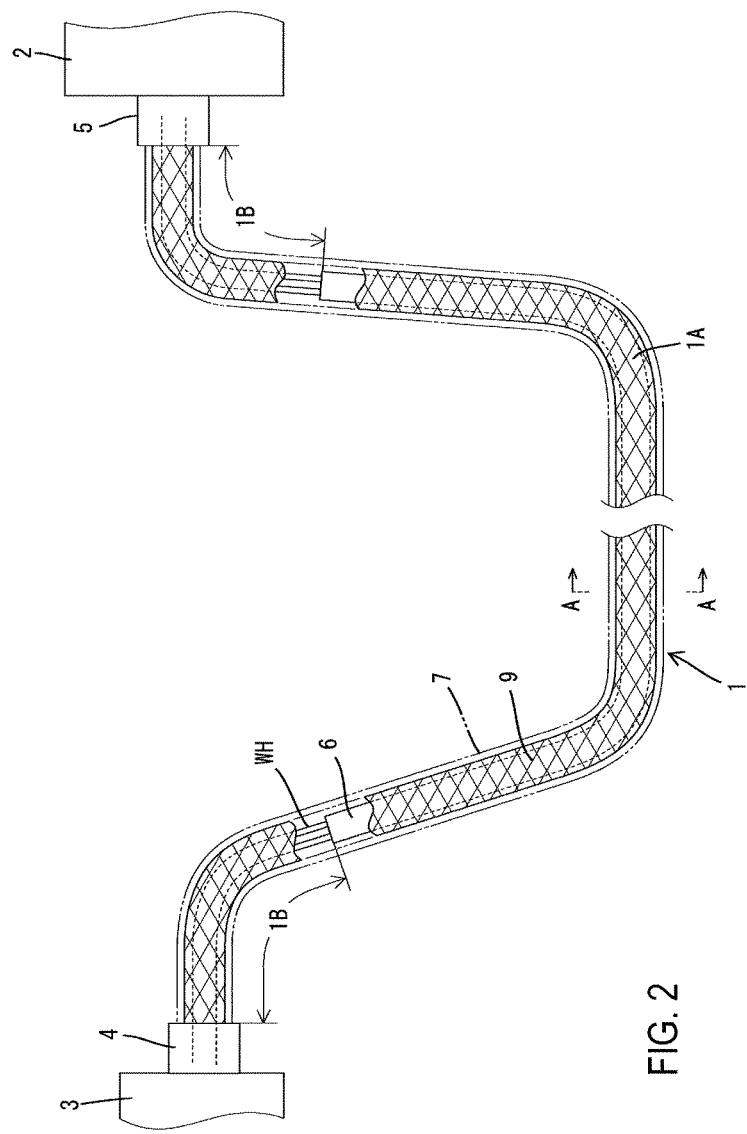
FIG. 2 is a front view showing an outline of an inner structure of the shielded pipe.
Figure 3:
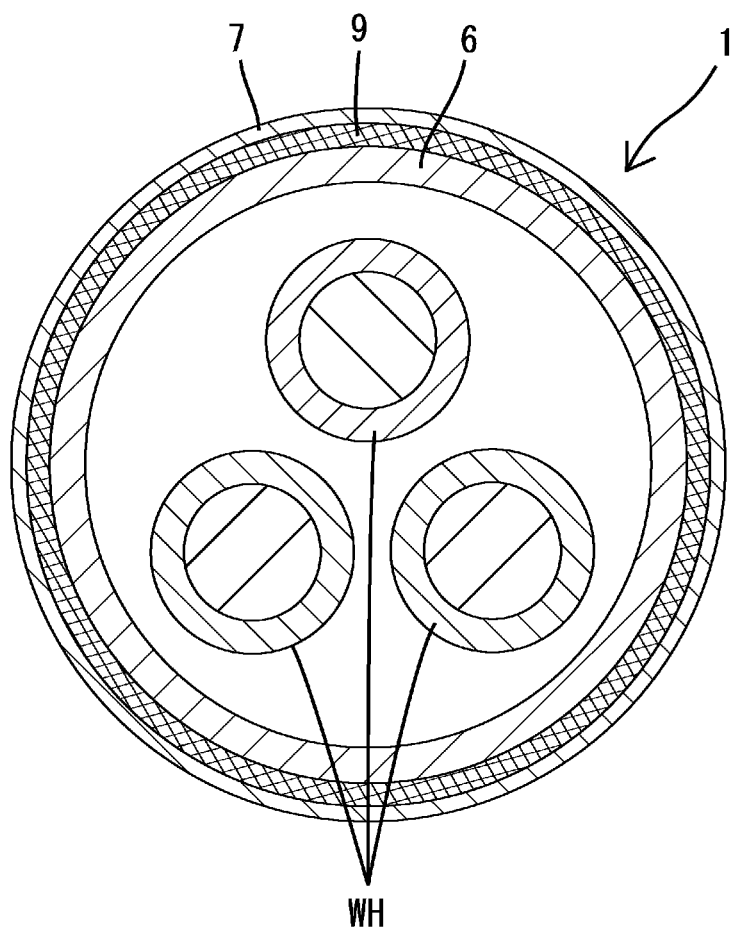
FIG. 3 is a cross-sectional view taken along line A-A in FIG. 2.

The wire harness WH includes a plurality of electric wires. Substantially the entire length of the wire harness WH is inserted into the shielded pipe 1. As shown in FIG. 1, the shielded pipe 1 is arranged underneath the floor of the vehicle. Terminal fittings (not shown) are connected to the two end portions of each electric wire, and are configured to be connected via connecting members 4 and 5 such as connectors to respective terminals on the battery 2 side and the inverter 3 side.

The shielded pipe 1 of this embodiment includes a pipe body 6 made of a synthetic resin, a shielding portion that sheathes the outer circumference of the pipe body 6 and is constituted by a braided wire 9, and a protective portion that sheathes the outer circumference of the shielding portion and is constituted by a heat-shrinkable tube 7.

The pipe body 6 is formed into an elongated pipe shape that has two open ends and a substantially circular cross section. The electric wires included in the above-mentioned wire harness WH are inserted into the pipe body 6. The pipe body 6 is formed to extend roughly in a front-rear direction of the vehicle as a whole, but it is partially bent three-dimensionally to bypass projecting portions and recessed portions underneath the floor of the vehicle or to extend along projections and recesses. The pipe body 6 is formed to have a length dimension corresponding to the length over the section of the wire harness WH for connecting the battery 2 and the inverter 3, but excluding very small sections at the two end portions of the wire harness WH.

The braided wire 9 is formed by braiding a large number of individual metal wires into a mesh structure having an elongated tubular shape, and has favorable flexibility. The individual wires of the braided wire 9 may be made of a copper-based metal material, for example, and their surfaces may be plated with tin. The braided wire 9 is formed to have an inner diameter that is large enough for the pipe body 6 to be inserted into the braided wire 9 and to be capable of suitably following the bent shape of the pipe body 6. Moreover, the entire braided wire 9 is set to be longer than the pipe body 6. Accordingly, when the braided wire 9 sheathes the pipe body 6, the two end portions of the braided wire 9 in the length direction can protrude from the pipe body 6. In this manner, in the shielded pipe 1, a length region in which the pipe body 6 is provided constitutes a fixed arrangement portion 1A, and length regions in which the braided wire 9 protrudes beyond the two respective ends of the pipe body constitute movable arrangement portions 1B having superior bendability. It should be noted that the two end portions of the braided wire 9 are attached to connecting members 4 and 5 for the battery 2 and the inverter 3, respectively, covering the same.

After sheathing the pipe body 6, the braided wire 9 is provided with an appropriate positioning means, which is not shown in the drawings, to prevent a position shift of the braided wire 9 in the length direction with respect to the pipe body 6. A method in which a plurality of metal crimping rings are used to crimp and fix the braided wire 9 to the pipe body 6 at appropriate intervals is possible as the positioning means. Moreover, the braided wire 9 is grounded at an appropriate position.

The protective portion for protecting the braided wire 9 is arranged at the outermost layer of the shielded pipe 1, that is, at the outer circumferential side of the braided wire 9. The protective portion of this embodiment is constituted by the heat-shrinkable tube 7. The heat-shrinkable tube 7 is formed in an elongated tubular shape having an inner diameter that is large enough for the braided wire 9 to be inserted into the heat-shrinkable tube 7 in a natural state. However, heating at a predetermined temperature enables the heat-shrinkable tube 7 to come into intimate contact with the outer circumferential surface of the shielding portion (braided wire 9) and protect the shielding portion. The heat-shrinkable tube 7 is formed to be long enough to cover the braided wire 9 over substantially the entire length. Specifically, the heat-shrinkable tube 7 covers the braided wire 9 over the length region in which the two end portions of the heat-shrinkable tube 7 respectively reach the above-mentioned connecting members 4 and 5.

The following describes operations and effects of the shielded pipe 1 according to this embodiment formed as described above.

(1) Since the pipe body 6, which is a main portion of the shielded pipe 1, is made of a synthetic resin, the entire weight of the shielded pipe 1 can be reduced compared with a conventional shielded pipe whose main portion is made of metal.

(2) Similarly, because the pipe body 6 is a molded article made of a synthetic resin, it is easy to form various bent shapes. Moreover, if the pipe body 6 is heated and bent after molding, it is easily bent compared with a metal pipe.

(3) The shielding portion is formed of the braided wire 9 and covers the entire pipe body 6 made of a resin, and thus a shielding function can be exhibited. Moreover, since the braided wire 9 integrally protrudes beyond the two end portions of the pipe body 6, a conventional dedicated member for connecting the braided wire 9 and the pipe body 6 is not necessary. Since such a dedicated member is generally made of metal, there is a concern of electrolytic corrosion between the dedicated member and the braided wire 9, but there is no such a concern in this embodiment. Furthermore, the braided wire 9 has favorable flexibility, and thus can suitably follow the bent shape of the pipe body 6.

(4) The protective portion is formed of the heat-shrinkable tube 7, thus easily sheathing the braided wire 9. In addition, in a shrunk state after heating, the protective portion can follow the shape of the braided wire 9 and come into intimate contact with the braided wire 9. Moreover, the heat-shrinkable tube 7 is not damaged from peeling compared with cases where the protective portion is made of a coating or the like, and thus a high protective function for the shielding portion can be exhibited. Furthermore, even if a portion of the heat-shrinkable tube 7 tears and the shielding portion is eroded by water infiltrating through the torn portion, since the pipe body 6 itself is made of resin, there is no possibility that the pipe body 6 breaks, unlike in cases where a shielded pipe 1 made of metal is used.

(5) In this embodiment, the braided wire 9 is provided not inside the pipe body 6 but on the outer circumferential side of the pipe body 6. The reason for this is that if the braided wire 9 is provided inside the pipe body 6, there is a concern that the braided wire is likely to come into contact with the inner circumferential surface of the bent portion during bending processing performed on the pipe body and may be damaged.

(6) In this embodiment, the braided wire 9 is formed to be longer than the pipe body 6, and to have a length that extends over the entire length between the connecting members 4 and 5 for the battery 2 and the inverter 3. In this regard, conventionally, the braided wires 9 are provided over ranges that respectively connect the two end portions of the pipe body 6 and the connecting members 4 and 5, and therefore, fastening bands for connecting the braided wires 9 to the two end portions of the pipe body 6 are needed. However, in this embodiment, such a fastening band is not needed, and an increase in contact resistance can be avoided.

(7) Furthermore, it is also conceivable that the pipe body 6 is formed of a corrugated tube, but this makes it difficult to maintain a bent state of the corrugated tube compared with the resin pipe body 6 used in this embodiment. If the bent state of a corrugated tube is to be maintained, measures such as disposing a plurality of clamps or the like at the bent portions, for example, need to be taken. However, such measures are not appropriate because the number of components is increased.

In this regard, since the pipe body 6 of this embodiment can retain its shape by itself, it is easy to maintain a desired bent state. Moreover, since the resin pipe body 6 of this embodiment has a higher rigidity than a corrugated tube, a sheath component such as a protector can be omitted. Therefore, this also contributes to a reduction in the number of components.

Other Embodiments

The present invention is not limited to the above embodiment, which has been described using the foregoing description and the drawings, and, for example, embodiments as described below are also encompassed within the technical scope of the present invention.

(1) Although the protective portion was constituted by the heat-shrinkable tube 7 in the foregoing embodiment, the protective portion can be omitted as long as the surface of the shielding portion is rustproofed. Moreover, the protective portion may also be constituted by the following means instead of the heat-shrinkable tube 7.

(i) The protective portion may be constituted by a tube made of a soft resin or rubber that can sheathe the shielding portion. A corrugated tube may be used as the protective portion.

(ii) A protective film may be formed on the outer circumferential surface of the shielding portion and used as the protective portion. For example, it is conceivable that the shielding portion is coated with a coating by applying a paint onto the shielding portion.

(2) Although a braided wire 9 that is integrally formed of a single member was shown as the shielding portion in the foregoing embodiment, a plurality of braided wires divided in the length direction may be connected. Moreover, the braided wire 9 is not limited to a braided wire braided into a tubular shape, and a braided wire braided into a sheet shape may be wound around the pipe body 6 to have a tubular shape.

(3) An exhaust pipe is sometimes arranged near the shielded pipe 1, and it is assumed that heat affects the shielded pipe 1. Therefore, it is desirable that the heat-shrinkable tube 7 has heat resistance.

LIST OF REFERENCE NUMERALS

1 . . . Shielded pipe
1B . . . Movable arrangement portion
6 . . . Pipe body
7 . . . Heat-shrinkable tube (protective portion)
9 . . . Braided wire (shielding portion)
WH . . . Wire harness

What is claimed is:

1. A shielded pipe into which an electric wire is insertable, comprising:
   a pipe body that is made of a synthetic resin material and is formed into a predetermined shape including a bend, the pipe body having sufficient rigidity to retain the predetermined shape by itself; and
   a shielding portion that is constituted by a braided wire made of a plurality of metal wires formed into a tubular shape and sheathes an outer circumferential surface of the pipe body, covering the pipe body over substantially its entire length,
   wherein the braided wire has flexibility and protrudes beyond at least one side of the pipe body to form (i) a movable arrangement portion having bendability in a length region in which the braided wire protrudes from the pipe body, the movable arrangement portion having a length longer than a diameter of the pipe body, and (ii) a fixed arrangement portion in a length region in which the pipe body is provided.

2. The shielded pipe according to claim 1, wherein the outer circumferential surface of the shielding portion is covered with a protective portion.

3. The shielded pipe according to claim 2, wherein the protective portion is a heat-shrinkable tube.

4. The shielded pipe according to claim 1, wherein the predetermined shape includes bends in three dimensions.

5. An assembly, comprising:
   an electric wire connecting a battery and an inverter; and
   the shielded pipe according to claim 1;
   wherein the electric wire is inside the shielded pipe.

* * * * *